United States Patent
Kang et al.

(10) Patent No.: US 8,149,213 B2
(45) Date of Patent: Apr. 3, 2012

(54) MOUSE POINTER FUNCTION EXECUTION APPARATUS AND METHOD IN PORTABLE TERMINAL EQUIPPED WITH CAMERA

(75) Inventors: Hwa-Young Kang, Suwon-si (KR); Young-Kwon Yoon, Seoul (KR); Jun-Young Lee, Yongin-si (KR); Sung-Wook Kang, Seoul (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 856 days.

(21) Appl. No.: 12/203,208

(22) Filed: Sep. 3, 2008

(65) Prior Publication Data
US 2009/0058807 A1     Mar. 5, 2009

(30) Foreign Application Priority Data
Sep. 5, 2007   (KR) .......................... 10-2007-89954

(51) Int. Cl.
*G09G 5/08*     (2006.01)
*G06F 3/033*    (2006.01)

(52) U.S. Cl. ...................... 345/157; 345/179; 178/19.05

(58) Field of Classification Search .......... 345/156–179; 455/556.1, 566, 575.1; 463/36–39; 178/19.01–19.07
See application file for complete search history.

(56) References Cited

U.S. PATENT DOCUMENTS

| | | | | |
|---|---|---|---|---|
| 6,128,007 A | * | 10/2000 | Seybold | 345/179 |
| 2004/0207597 A1 | * | 10/2004 | Marks | 345/156 |
| 2006/0274038 A1 | * | 12/2006 | Redkov et al. | 345/157 |

* cited by examiner

*Primary Examiner* — Stephen Sherman
(74) *Attorney, Agent, or Firm* — Cha & Reiter, LLC

(57) ABSTRACT

An apparatus and a method for executing a mouse pointer function in a portable terminal equipped with a camera are disclosed. The method includes: capturing an external image signal by a camera module; sampling the external image signal and converting a sampled image signal into image data; mapping a group of pixels of the image data generated by the sampling to a group of pixels of an image sensor for each unit pixel on a one-to-one basis; detecting coordinate values of image data including a point light source in the group of the mapped pixels; determining if a point light source is actually included in the detected coordinate values of the image data; and displaying the detected coordinate values of the image data determined to include the point light source on a screen.

12 Claims, 5 Drawing Sheets

EXECUTE SELECTED VALUE

MOUSE WINDOW ARRAY CONFIGURED BY
MULTIPLE GROUPS OF PIXEL ARRAYS

MOUSE POINTER FUNCTION EXECUTION APPARATUS AND METHOD IN PORTABLE TERMINAL EQUIPPED WITH CAMERA

CROSS REFERENCE TO RELATED APPLICATION

This application related to co-pending Korean patent application entitled "Mouse Pointer Function Execution Apparatus and Method in Portable Terminal Equipped with Camera," filed in the Korean Intellectual Property Office on Sep. 6, 2007 and assigned Serial No. 2007-90505 and to be filed in the United States Patent and Trademark Office on Sep. 3, 2008, assigned to the same assignee, and herein incorporated by simple reference.

CLAIM OF PRIORITY

This application claims the benefit of an earlier patent application entitled "Mouse Pointer Function Execution Apparatus and Method in Portable Terminal Equipped with Camera," filed in the Korean Intellectual Property Office on Sep. 5, 2007 and assigned Serial No. 2007-89954, the contents of which are incorporated herein by reference.

BACKGROUND OF THE INVENTION

1. Field of the Invention

The present invention relates to a portable device, and more particularly to an apparatus and a method for executing a mouse pointer function in a portable terminal equipped with a camera.

2. Description of the Related Art

A portable terminal provides a communication function in which a user can talk over the telephone or exchange data with the other party while the user is moving, such as a cellular phone, a Personal Digital Assistant (PDA), a Personal Communication Services phone (PCS), an International Mobile Telecommunication-2000 (IMT-2000) terminal, a Global System for Mobile communication (GSM) terminal, and the like.

The portable terminal is commonly used anywhere in the world by people of all ages and sexes and almost become a necessity. Today's trend is getting smaller, slimmer, and lighter, and mostly heading towards the provision of a multimedia device providing more various functions. In due course, it will change in its form in such a manner as to be adapted to various multimedia environments or an internet environment.

An input scheme in an input device of the portable terminal as described above is classified into a key button scheme, a touchpad scheme, and a scheme using a mouse. Herein, in the key button scheme, information is input by a combination of key inputs. In the touchpad scheme, information is input to a screen by using a finger or a pen pointer. The scheme using the mouse is frequently used for a personal computer or a notebook computer.

The key button scheme is a scheme traditionally used in a portable terminal for inputting necessary information by using one or more keys required for information input located in a space allocated to the portable terminal. Since a lot of key button schemes have been used by users and the users are currently accustomed to using the key button scheme in most portable terminals, the key button scheme makes it easy to input information, such as characters and numerals.

Accordingly, in the touchpad scheme, the user can easily input information simply by using the input means, such as a finger and a pen of the user, without a need for being familiar with a combination scheme which a user must be previously familiar with. The mouse scheme allows a user to input desired information by using a mouse.

However, the portable terminals equipped with the functions as described above have their respective drawbacks. First, a problem of the key input is that a particular space must be allocated to the portable terminal, and that is inconvenient for the user to be previously familiar with information inscribed on the face of each button. Also, notation methods for a button are different from one another according to each manufacturer, and thus the user must be newly familiar with information on a button when the user uses another portable terminal produced by different manufacturer.

In the touchpad scheme, since a resolution decreases in response to the user's direct input of information by using the input means, such as a finger and a pen, undesired other information may be input. Also, due to the operation of a touchpad by another object, undesired information may be input even at a moment when the user does not input information. Also, the scheme using the mouse requires a mouse pad and an even part, which causes the limitation of use space. Moreover, in editing a photograph or using a graphic user interface by using a portable terminal, each of the portable terminals equipped with the functions as described above has difficulty in using the graphic user interface, and is not enough to paint a picture or perform a painting task.

SUMMARY OF THE INVENTION

Accordingly, the present invention has been made to solve the above stated problems occurring in the prior art, by providing an apparatus and a method for inputting a user's desired information by using a camera module mounted in a portable terminal.

In accordance with an aspect of the present invention, a method for executing a mouse pointer function by a portable terminal equipped with a camera includes: capturing an external image signal by a camera module; sampling the external image signal and converting a sampled image signal into image data; mapping a group of pixels of the image data generated by the sampling to a group of pixels of an image sensor for each unit pixel on a one-to-one basis; detecting coordinate values of image data including a point light source in the group of the mapped pixels; determining if a point light source is actually included in the detected coordinate values of the image data; and displaying the detected coordinate values of the image data determined to include the point light source on a screen.

In accordance with another aspect of the present invention, an apparatus for executing a mouse pointer function in a portable terminal equipped with a camera includes: a camera module for receiving as an input an external image signal; and an input device for delivering a signal source recognizable by the camera module to the camera module.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE INVENTION

Hereinafter, exemplary embodiments of the present invention will be described in detail with reference to the accompanying drawings. Particulars found in the following description of the present invention, such as specific configuration elements, etc. are provided only to help comprehensive understanding of the present invention, and it is obvious to those skilled in the art that various changes in form and details may be made in the particulars without departing from the spirit and scope of the invention. For the purposes of clarity and simplicity, a detailed description of known functions and configurations incorporated herein will be omitted as it may make the subject matter of the present invention unclear.

In order to solve the problems mentioned in the prior art, the present invention proposes a new method in which a user can accurately input desired information by using an input device easily controllable by fingers of the user and a camera module mounted in a portable terminal. Hereinafter, a detailed description of the present invention will be made referring to a block diagram illustrating the configuration of an apparatus and a flowchart illustrating the method according to the present invention.

Figure 1:
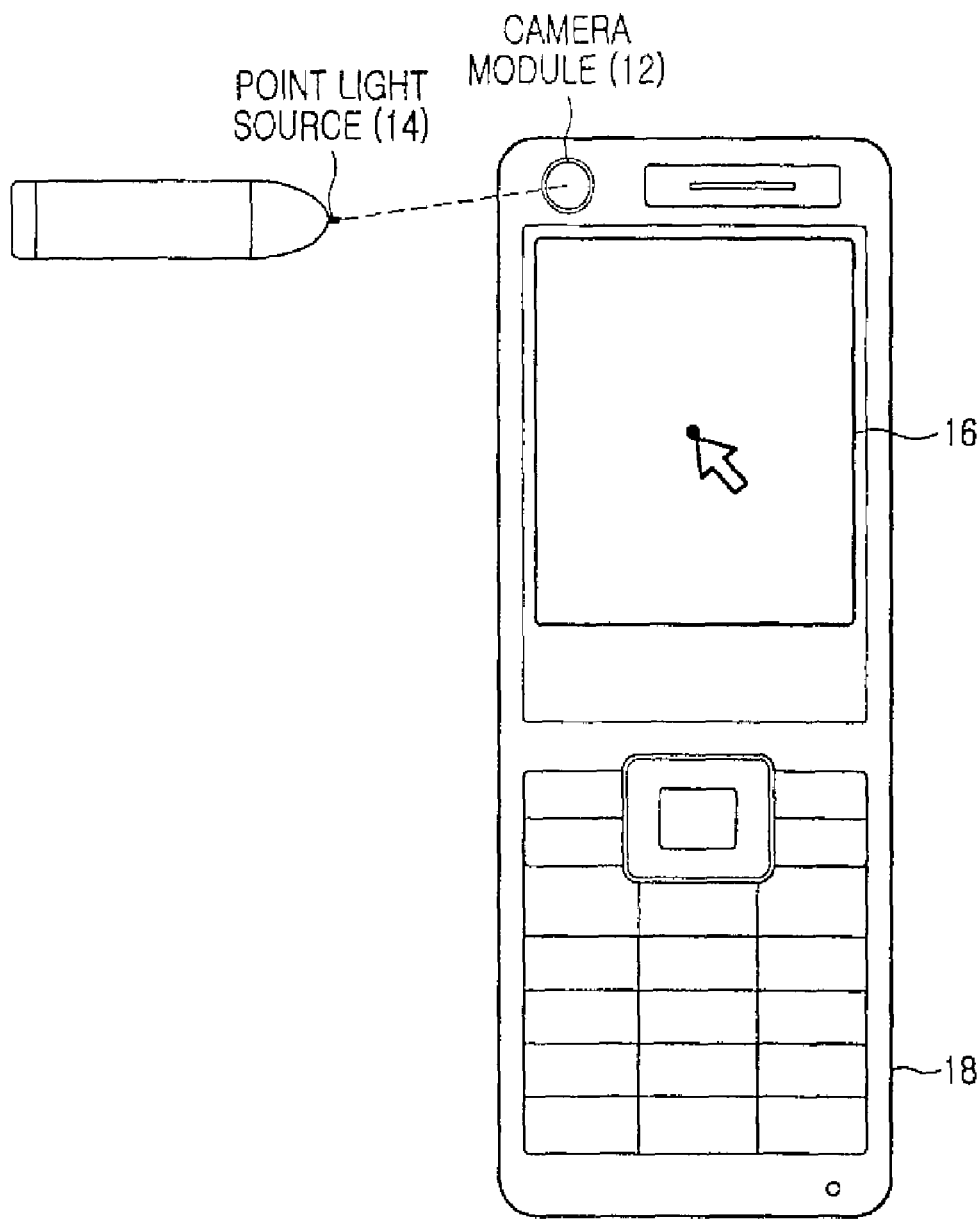
FIG. 1 illustrates data input using a point light source according to an embodiment of the present invention.

FIG. 1 illustrates data input using a point light source according to one embodiment of the present invention.

Referring to FIG. 1, the mouse pointer function execution apparatus 10 according to the present invention includes a camera module 12, an input device 145 and a screen 16. Herein, the camera module 12 is mounted in a portable terminal 18. The input device 14 can be easily switched on or off by a user. The screen 16 displays the movement of the input device 14. The output of the pen-shaped input device 14 according to the present invention uses a point light source, such as a Light-Emitting Diode (LED) and infrared rays, and the like. The point light source is provided at a front end portion of the input device 14 in a projected shape in order to prevent the point light source from being obstructed while the point light source moves toward the camera module. The point light source output from the input device 14 is sensed by an image sensor within the camera module 12 mounted in the portable terminal 18, and accordingly, information on the point light source is displayed on the screen 16.

Herein, the image sensor within the camera module 12 mounted in the portable terminal 18 has the characteristics of efficiently absorbing visible light or infrared rays. The configuration of the image sensor will be described in detail as follows.

Figure 2:
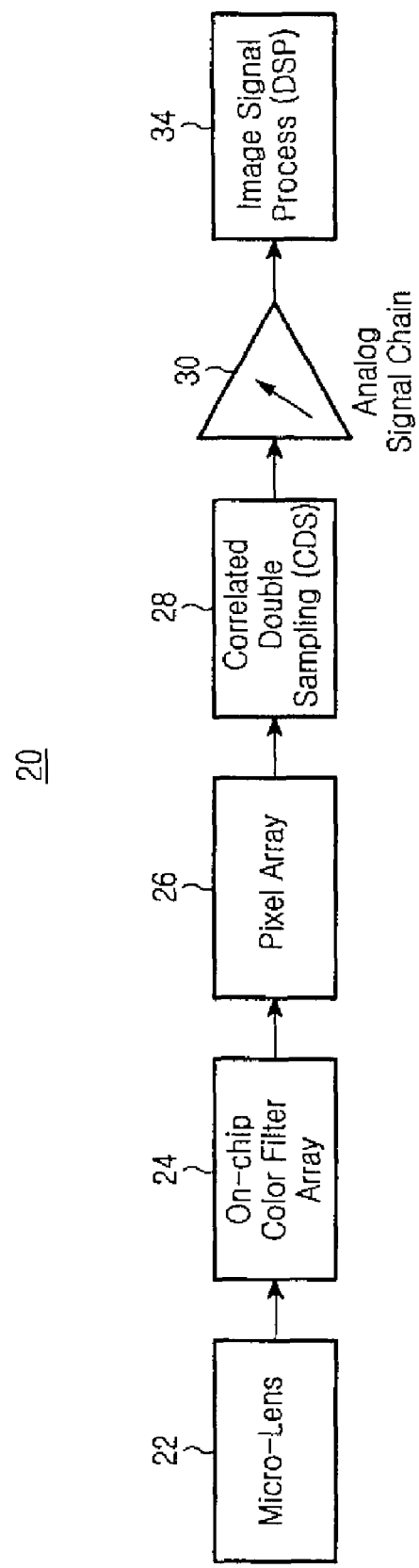
FIG. 2 is a block diagram illustrating a configuration in an image sensor of a camera module to which the present invention is applied.

FIG. 2 is a block diagram illustrating a configuration in the image sensor 20 of the camera module 10 to which the present invention is applied.

Referring to FIG. 2, an external image is received as input to a micro-lens unit 22, and is then divided into unit pixels. The external image in a pixel form passes through a color filter unit 24, and is then transmitted to a filter group, pixel array 26, for imaging an external image. The filter group, N*M pixel array 26, forms a unit pixel by using a photo diode, and formed unit pixels are arranged in X and Y coordinate directions so as to generate a desired image. By sampling an image signal corresponding to a relevant position of each unit pixel in a group of pixels, image data in a mosaic form is generated. Note that the technique of converting each unit pixel and sampling to generate a mosaic form is briefly described here as it is know in the art. The generated image data in the mosaic form is converted into an electrical signal, the electrical signal passes through a Correlated Double Sampling (CDS) unit 28 and an Analog Signal Chain (ASC) unit 30, and an analog image signal is then output from the ASC unit 30. The analog image signal is converted into a digital signal by an Analog-to-Digital Converter (ADC), and the digital signal is then delivered to an image signal processing unit 34.

The image data in the mosaic form generated by sampling the external image signal by the image sensor as illustrated in FIG. 2 can be expressed in a coordinate form with X and Y axes respectively corresponding to horizontal and vertical axes. X and Y coordinates as described above can be mapped to coordinates of unit pixels within the filter group of the image sensor on a one-to-one basis. The image sensor of the subject application samples a received external image signal and generates a mosaic-formed image data. This generated image data can be expressed in a coordinate form. Also, in the subject application, the unit pixels generated in a filter group is orderly arranged along the coordinate. These arranged unit pixels map with the image data one by one.

Figure 3:
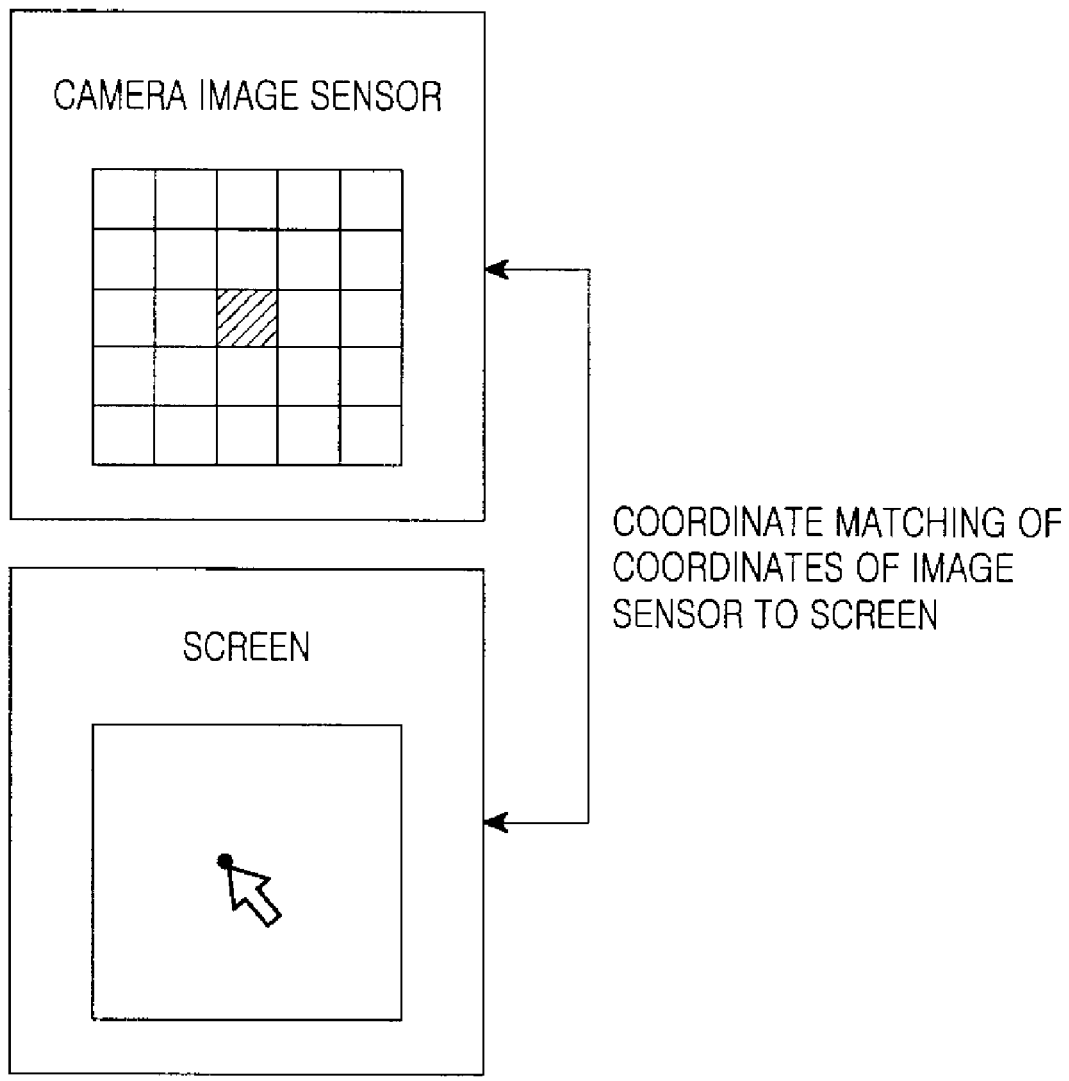
FIG. 3 illustrates the mapping of a point light source signal configured by a single pixel or multiple pixels to a group of pixels of the image sensor according to an embodiment of the present invention.

FIG. 3 illustrates the mapping of a point light source signal configured by a single pixel or multiple pixels to a group of pixels of the image sensor according to an embodiment of the present invention. As shown, when a strong point light source signal is received as input along with a captured image light signal, by searching for X and Y coordinates in the group of pixels of the image sensor, a position value of the received point light source signal can be detected. Note that the light output generated by the input device 14 is stronger than the external image being captured by the camera module 12. Then, the detected position value of the received point light source signal can be displayed on the screen through the image signal processing unit.

Referring to FIG. 3, when the user emits a point light source signal having a light source, such as visible light and infrared rays, to the camera module mounted in the portable terminal by using the input device which can be easily switched on or off by the user, the image sensor of the camera module receives as input the point light source along with an external image light signal, and the received point light source signal is displayed on the screen according to X and Y coordinates of the received point light source signal. At this time, since the point light source signal is emitted by the input device in such a manner as to integrate the visible light or the infrared rays, it has the characteristics of a signal stronger than the external image signal. Due to these characteristics, a position of the point light source signal can be detected by the mapping as described above.

Also, a signal size of the external image signal is reduced by setting an exposure time of the image sensor to a value small enough, and only the point light source signal corresponding to a stronger signal than the external image signal is produced as effective data, so that a position value of the effective data may be detected. A description of a process for detecting a point light source according to one embodiment of the present invention will be made as follows.

Figure 4:
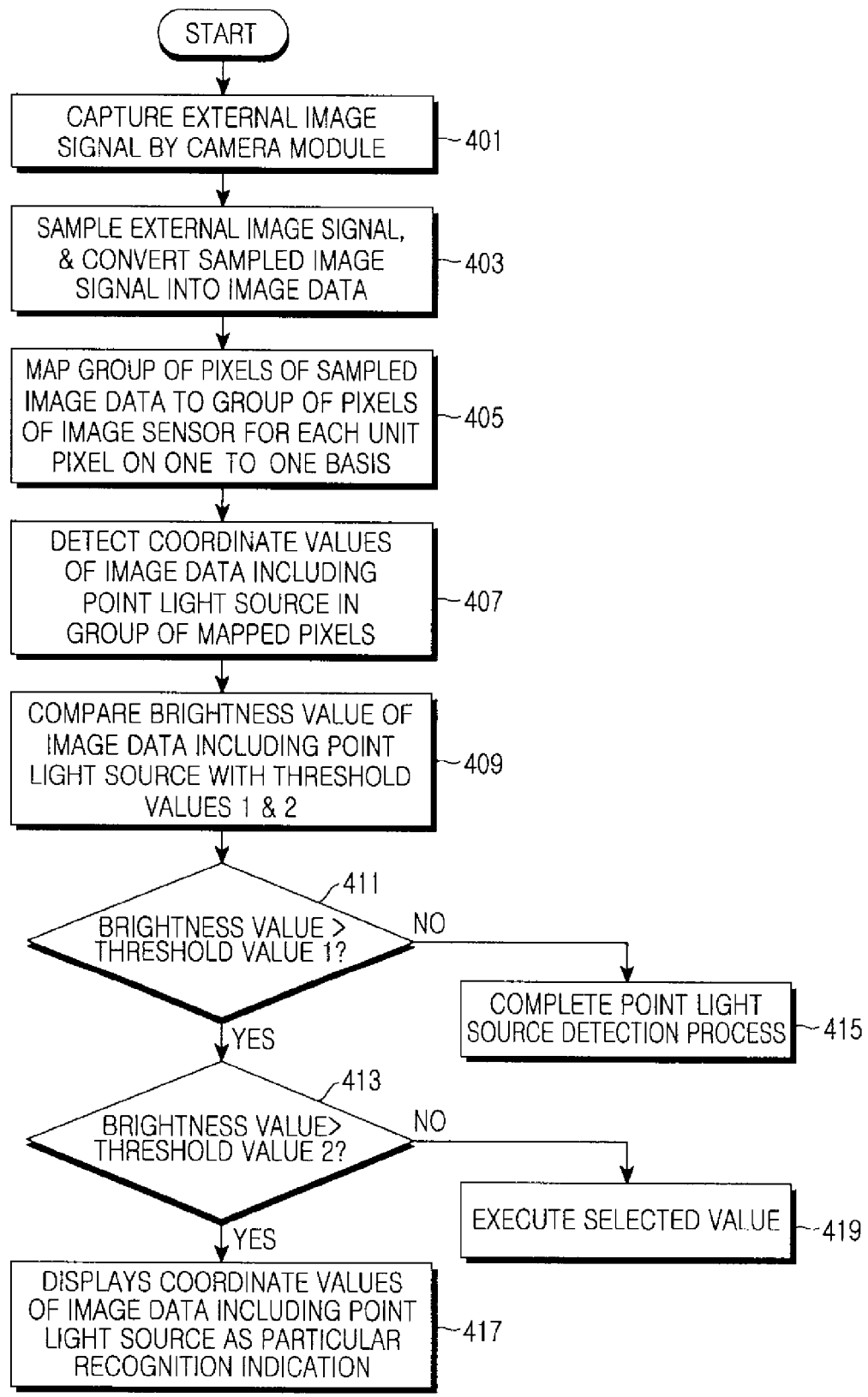
FIG. 4 is a flowchart illustrating a process for detecting a point light source signal emitted by an input device according to an embodiment of the present invention.

FIG. 4 is a flowchart illustrating the process of detecting the point light source signal emitted by the input device according to the embodiment of the present invention. Namely, FIG.

4 illustrates such a process that a point light source emitted by the input device is output to the screen by using the image sensor.

Referring to FIG. 4, first, a point light source signal is received as input by the camera module in step 401. In step 403, the image sensor of the camera module samples a received external image signal, and converts the sampled image signal into image data. In step 405, a group of pixels of the converted image data including a combination of unit pixels is mapped to a group of pixels of the image sensor for each unit pixel in a one-to-one basis, and then the group of pixels of the image data regarding the external image signal is output to the screen of the portable terminal. That is, the image sensor samples a received external image signal and generates a mosaic-formed image data, and then the generated image data can be expressed in a coordinate form. Here, the unit pixels generated in a filter group is orderly arranged along the coordinate, and these arranged unit pixels map with the image data one by one. Since the group of pixels of the image data regarding the external image signal is mapped to the group of pixels of the image sensor in a one-to-one basis, it is possible to detect a position value of a particular pixel.

At this time, a strong signal source corresponding to a point light source may exist in the mapped image data. In step 407, in order to determine the existence of the strong signal source, coordinate values of a pixel of the strong signal source corresponding to the point light source are detected. In step 409, a brightness value of the image data including the point light source is calculated, and the calculated brightness value then is compared with a threshold value_1 and a threshold value_2, which are previously stored in the portable terminal as particular values, respectively.

If it is determined in step 411 that a brightness value of the image data including the point light source is smaller than the threshold value_1, the process proceeds to step 415 to determine that there is no output of the input device, and completes the detection of the point light source. On the contrary, if it is determined in step 411 that a brightness value of the image data including the point light source is larger than the threshold value_1, the process proceeds to step 413.

If it is determined in step 413 that the brightness value of the image data including the point light source is larger than the threshold value_2, the process proceeds to step 417, and displays the coordinate values of the image data including the point light source as a particular recognition indication on the screen. By doing this, it is possible to move a recognition indication in a desired direction on the screen or input a comment desired by the user on the screen.

On the contrary, if it is determined in step 413 that the brightness value of the image data including the point light source is smaller than the threshold value_2, the process proceeds to step 419, and performs the same role as an enter key of a keyboard in order to execute a selected value on the screen. Note that the threshold value_2 is provided to distinguish an input for conventional key activation and an input for the point light source to display the pointer in the screen.

Herein, the threshold value_1 and the threshold value_2 refer to reference values necessary to determine a brightness or an intensity of visible light or infrared rays emitted by the input device. The threshold value_1 is used to determine if external image data includes the point light source. The threshold value_2 is used to discriminate among intensity values (or brightness values) different from each other depending on a distance of a detector from the point light source when it is determined that the external image data includes the point light source.

Figure 5:
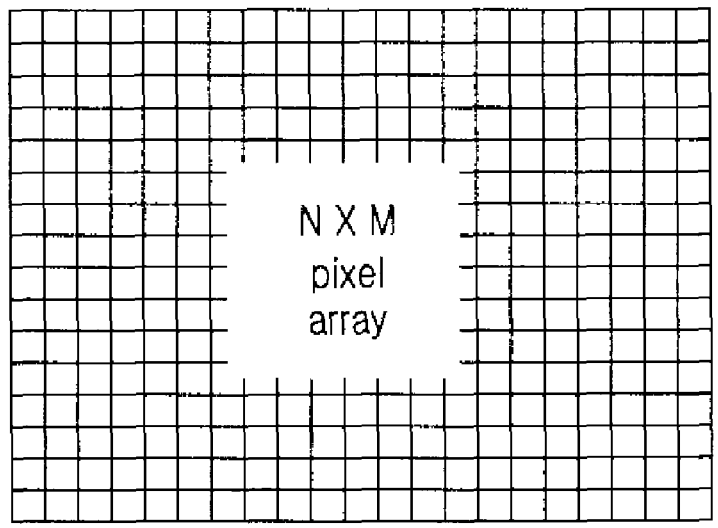
FIG. 5 illustrates the mapping of multiple pixels of an activated point light source to a group of pixels of the image sensor according to an embodiment of the present invention.
Figure 5:
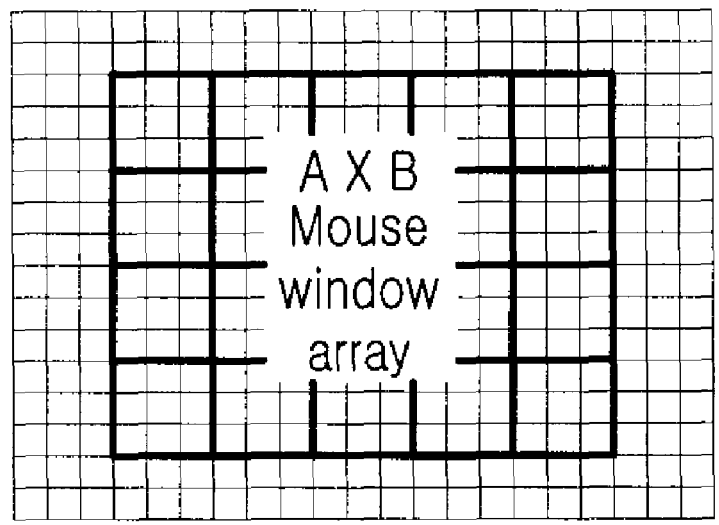

FIG. 5 illustrates the mapping of multiple pixels of an activated point light source to a group of pixels of the image sensor according to the embodiment of the present invention.

In FIG. 5, the group of pixels of the image sensor of the camera module is illustrated. The group of pixels of image data responsive to the received external image signal in form of a mosaic image data, which is expressed in a coordinate form, is mapped to the group of pixels of the image sensor for each unit pixel on a one-to-one basis. Accordingly, a group of pixels of the image data generated by sampling the external image signal can be output to the screen of the portable terminal.

When multiple unit pixels of the point light source are detected in the group of pixels of the image data regarding the external image signal, the detected multiple unit pixels of the point light source can be mapped to the group of pixels of the image sensor (refer to the second view of FIG. 5). All rays of visible light or infrared rays emitted by the input device are included in the group of pixels of the image data regarding the external image signal configured by the multiple unit pixels.

Visible light or infrared rays recognizable by the image sensor of the camera module mounted in the portable terminal can be used as a point light source (i.e. a signal source). Besides, all light sources which can be configured as a small but fully bright point light source recognizable by the image sensor, can be considered as a signal source.

The input device is configured for convenient use as a small mouse having such a shape that a user can switch the input device between modes thereof while holding it with the user's fingers, or as a fingernail mouse which can be fixed onto a fingertip of the user. Also, the input device is equipped with a light source which can be switched between on and off modes thereof by the user so that the user can send a desired signal.

Features of a use environment are as follows: when a signal is input to the front of the camera, the input device may be used as a space-type mouse, or a signal may be input while changing the position of a light source on a flat part similarly in a usual environment for the use of a mouse. Accordingly, the input device can be used regardless of a curved state or the color of the flat part. Also, when a viewing angle of the camera module mounted in the portable terminal increases, the user so fully moves the input device that the portable terminal can relatively sophisticatedly display an output value on the screen thereof.

As described above, the configuration and the operation of the apparatus and the method for executing the mouse pointer function according to one embodiment of the present invention can be implemented in the portable terminal equipped with the camera. According to the present invention as described above, since information desired by the user is input by using the camera module mounted in the portable terminal, it is possible to input the information regardless of the limitation of space.

Meanwhile, while the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

What is claimed is:

1. A method for executing a mouse pointer function by a portable terminal having a camera module and a screen, the method comprising:

capturing an external image signal by the camera module;

sampling the external image signal and converting the sampled image signal into sampled image data;

mapping a group of pixels of the sampled image data to a group of pixels of an image sensor of the camera module for each unit pixel on a one-to-one basis;

detecting coordinate values of the image data including a point light source in the group of the mapped pixels;

determining if a brightness value of the image data is larger than a first threshold value, wherein the first threshold value is used to determine if the image data includes the point light source displaying, as a particular recognition indication, the detected coordinate values of the image data determined to include the point light source on the screen if the brightness value of the image data is larger than the first threshold value; and executing the mouse pointer function on the screen by determining if the brightness value of the image data is larger than a second threshold value, wherein the second threshold value is used to discriminate among intensity values.

2. The method as claimed in claim 1, wherein converting the sampled image signal into the image data is performed by the image sensor of the camera module.

3. The method as claimed in claim 1, wherein, in the mapping the group of pixels of the image data generated by the sampling, coordinates are generated with X and Y axes as reference in the group of pixels of the image sensor, and the generated coordinates are mapped to the screen.

4. The method as claimed in claim 1, wherein the coordinate values of the image data are displayed as the particular recognition indication if a brightness value of the image data including the point light source is larger than a set threshold value.

5. The method as claimed in claim 1, wherein, in the determining if the point light source is included in the detected coordinate values of the image data, determining if a brightness value of the image data larger than a first threshold value, and if so, determining if the brightness value of the image data is larger than a second threshold value.

6. The method as claimed in claim 5, wherein, if the brightness value of the image data is larger than the second threshold value, displaying the detected coordinate values of the image data determined to include the point light source on a screen; otherwise, treating the point light source as a conventional key entry.

7. An apparatus for executing a mouse pointer function in a portable terminal equipped with a camera, comprising:

a camera module including a image sensor for sampling an external image signal, converting the sampled image signal into image data, mapping a group of pixels of the sampled image data to a group of pixels of an image sensor of the camera module for each unit pixel on a one-to-one basis, detecting coordinate values of the image data including a point light source, determining if a brightness value of the image data is larger than a first threshold value, wherein the first threshold value is used to determine if the image data includes the point light source;

an input device for delivering a point light signal recognizable by the camera module; and a screen for displaying, as a particular recognition indication, the detected coordinate values of the image data determined to include the point light source on the screen if the brightness value of the image data is larger than the first threshold value, wherein the mouse pointer function executes on the screen by determining if the brightness value of the image data is larger than a second threshold value, wherein the second threshold value is used to discriminate among intensity values.

8. The apparatus as claimed in claim 7, wherein the camera module receives as the input the external image signal through an image sensor thereof.

9. The apparatus as claimed in claim 7, wherein the input device uses the point light signal detectable by the image sensor, wherein the point light signal comprises a visible light or an infrared ray.

10. The apparatus as claimed in claim 7, wherein the input device selectively emits the light signal to an image sensor of the camera module through a switch, wherein the point light signal comprises a visible light or an infrared ray.

11. The apparatus as claimed in claim 7, wherein the predetermined threshold is a second threshold, and further wherein the apparatus executes an "enter" command for a screen selection based on a comparison of the brightness of the point light source to a first threshold.

12. The apparatus as claimed in claim 11, wherein, if the brightness value of the point light source exceeds the first and second thresholds, the detected coordinate values of the image data determined to include the point light source are displayed as the particular recognition indication, and if the brightness value does not exceed the second threshold value but exceeds the first threshold value, the "enter" command for the screen selection is executed.

* * * * *